United States Patent
Bellgardt et al.

(10) Patent No.: US 11,244,281 B2
(45) Date of Patent: Feb. 8, 2022

(54) DEVICE FOR FEEDING PRODUCTS AND METHOD FOR RECORDING A STOCK OF PRODUCTS

(71) Applicant: POS TUNING Udo Vosshenrich GmbH & Co. KG, Bad Salzuflen (DE)

(72) Inventors: Andreas Bellgardt, Delbrueck (DE); Udo Vosshenrich, Bad Salzuflen (DE); Oliver Vosshenrich, Bad Salzuflen (DE)

(73) Assignee: POS TUNING Udo Vosshenrich GmbH & Co. KG, Bad Salzuflen (DE)

( * ) Notice: Subject to any disclaimer, the term of this patent is extended or adjusted under 35 U.S.C. 154(b) by 84 days.

(21) Appl. No.: 16/488,639

(22) PCT Filed: Feb. 20, 2018

(86) PCT No.: PCT/EP2018/054140
§ 371 (c)(1),
(2) Date: Aug. 26, 2019

(87) PCT Pub. No.: WO2018/153852
PCT Pub. Date: Aug. 30, 2018

(65) Prior Publication Data
US 2021/0142262 A1    May 13, 2021

(30) Foreign Application Priority Data
Feb. 27, 2017 (DE) .................... 10 2017 104 041.2

(51) Int. Cl.
*G06Q 10/08* (2012.01)
*A47F 1/12* (2006.01)

(52) U.S. Cl.
CPC .......... *G06Q 10/087* (2013.01); *A47F 1/126* (2013.01)

(58) Field of Classification Search
CPC ............................ G06Q 10/087; A47F 1/126
See application file for complete search history.

(56) References Cited

U.S. PATENT DOCUMENTS 8,260,456 B2 * 9/2012 Siegel .................... A47F 1/126
700/244
8,676,377 B2 * 3/2014 Siegel .................... G06Q 10/08
700/244

(Continued)

FOREIGN PATENT DOCUMENTS

EP    1 541 064 A1    6/2005

OTHER PUBLICATIONS

International Search Report of PCT/EP2018/054140, dated May 22, 2018.

(Continued)

*Primary Examiner* — Michael Collins
(74) *Attorney, Agent, or Firm* — Collard & Roe, P.C.

(57) ABSTRACT

The present invention relates to a device for feeding products, comprising a compartment for storing a plurality of products, on which compartment one or more products can be removed at a removal region, and on the side opposite the removal region a slider pretensioned by a spring rests against one of the products and is moved in the feed direction when a product is removed, wherein a sensor is provided for recording the stock of products, and a method for recording a stock of products on a compartment having a plurality of products.

12 Claims, 11 Drawing Sheets

(56) References Cited

U.S. PATENT DOCUMENTS

| | | | | |
|---|---|---|---|---|
| 8,941,495 B2* | 1/2015 | Wiese | G08B 13/08 |
| | | | 340/568.8 |
| 9,576,417 B2* | 2/2017 | Christianson | G07F 11/38 |
| 10,702,076 B2* | 7/2020 | Mercier | G01B 21/16 |
| 10,993,550 B2* | 5/2021 | Ewing | A47F 3/002 |
| 2005/0040123 A1 | 2/2005 | Ali | |
| 2007/0273513 A1* | 11/2007 | White | G08B 13/149 |
| | | | 340/568.8 |
| 2009/0248198 A1* | 10/2009 | Siegel | G06Q 10/08 |
| | | | 700/231 |
| 2011/0055103 A1* | 3/2011 | Swafford, Jr. | A47F 1/126 |
| | | | 705/345 |
| 2011/0304316 A1* | 12/2011 | Hachmann | A47F 3/002 |
| | | | 324/76.11 |
| 2012/0091162 A1* | 4/2012 | Overhultz | A47F 1/126 |
| | | | 221/1 |
| 2012/0245969 A1* | 9/2012 | Campbell | G06Q 10/087 |
| | | | 705/7.11 |
| 2014/0008382 A1 | 1/2014 | Christianson | |

OTHER PUBLICATIONS

German Search Report dated Nov. 13, 2017 (with English translation of relevant parts).

* cited by examiner

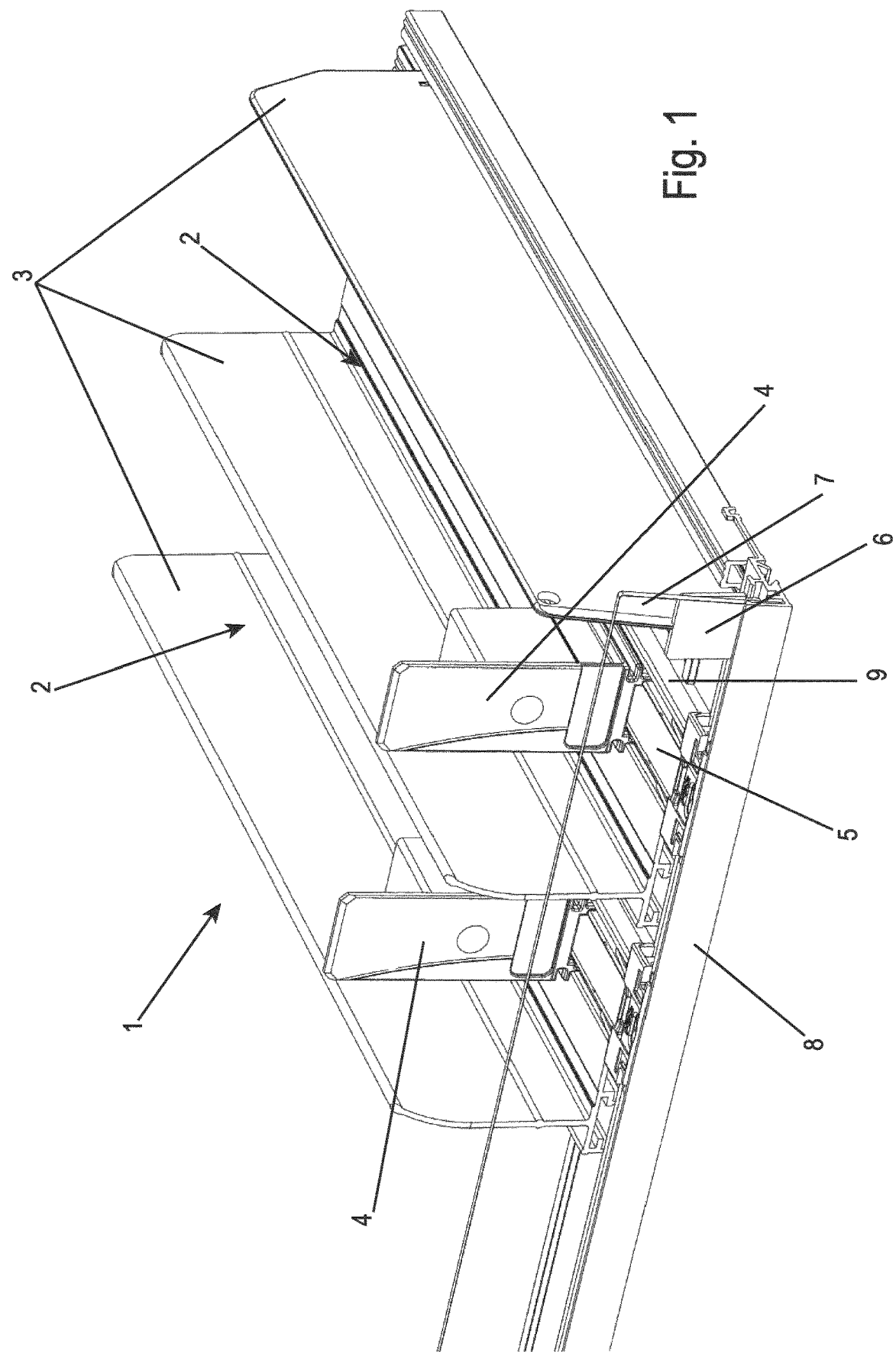

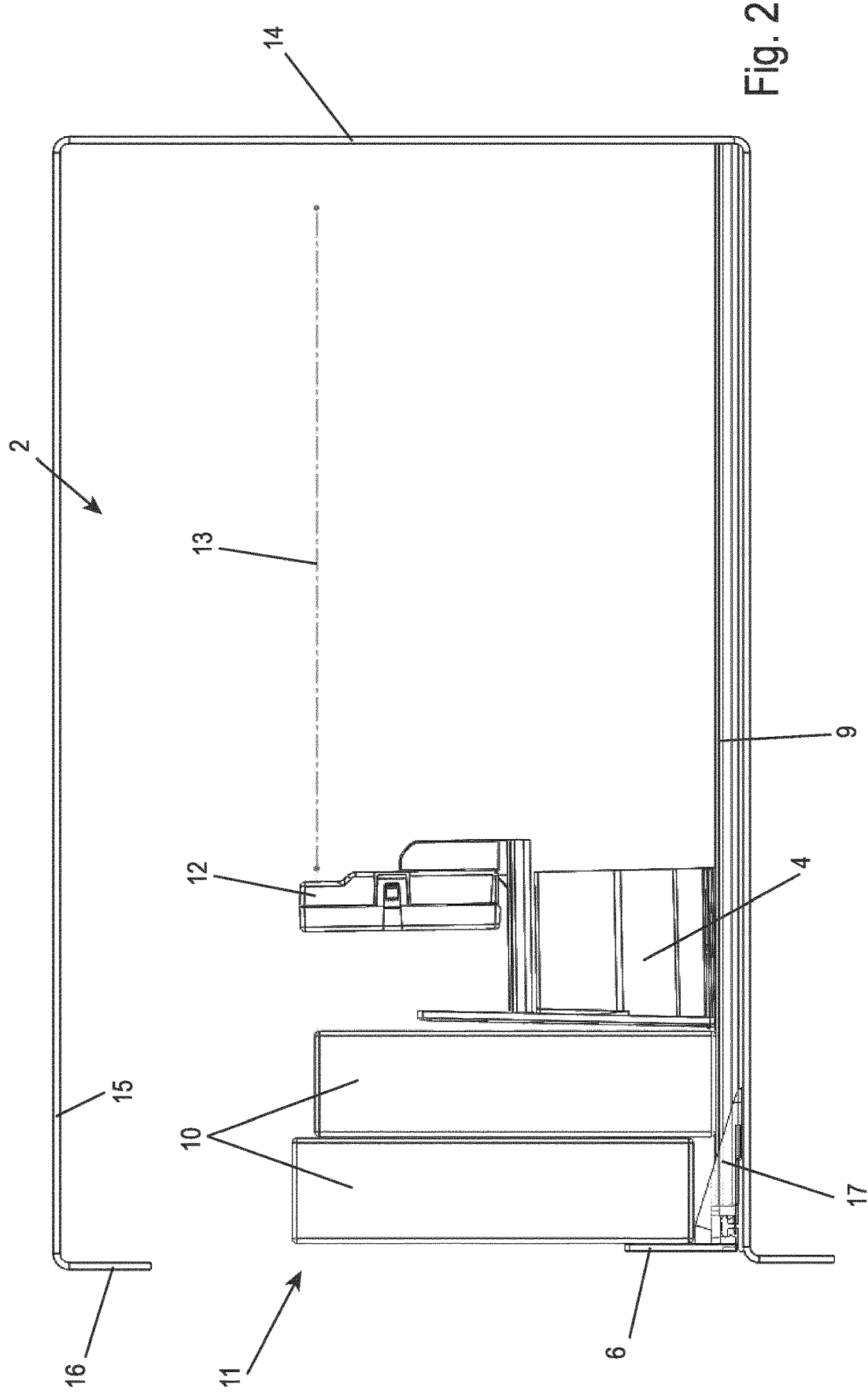

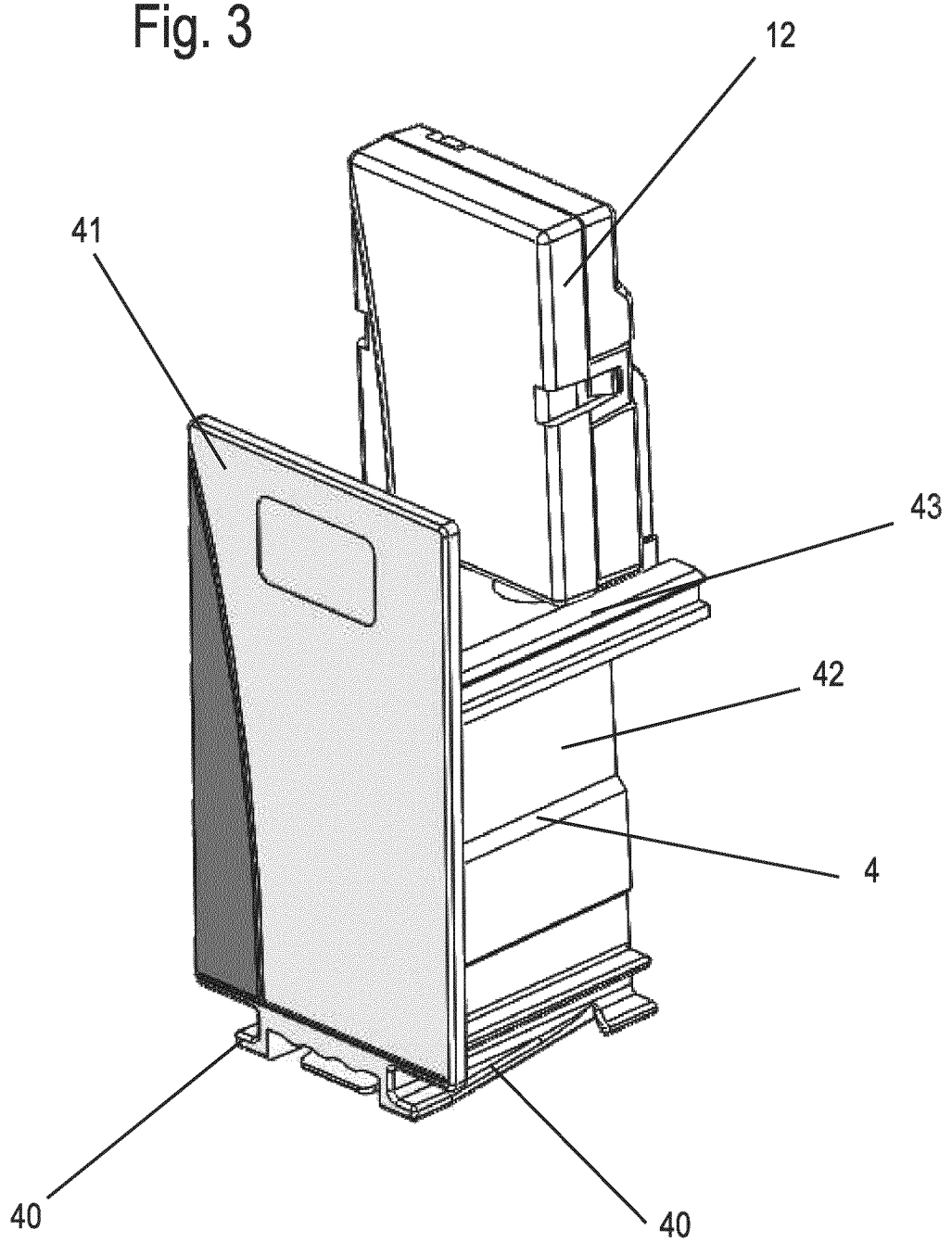

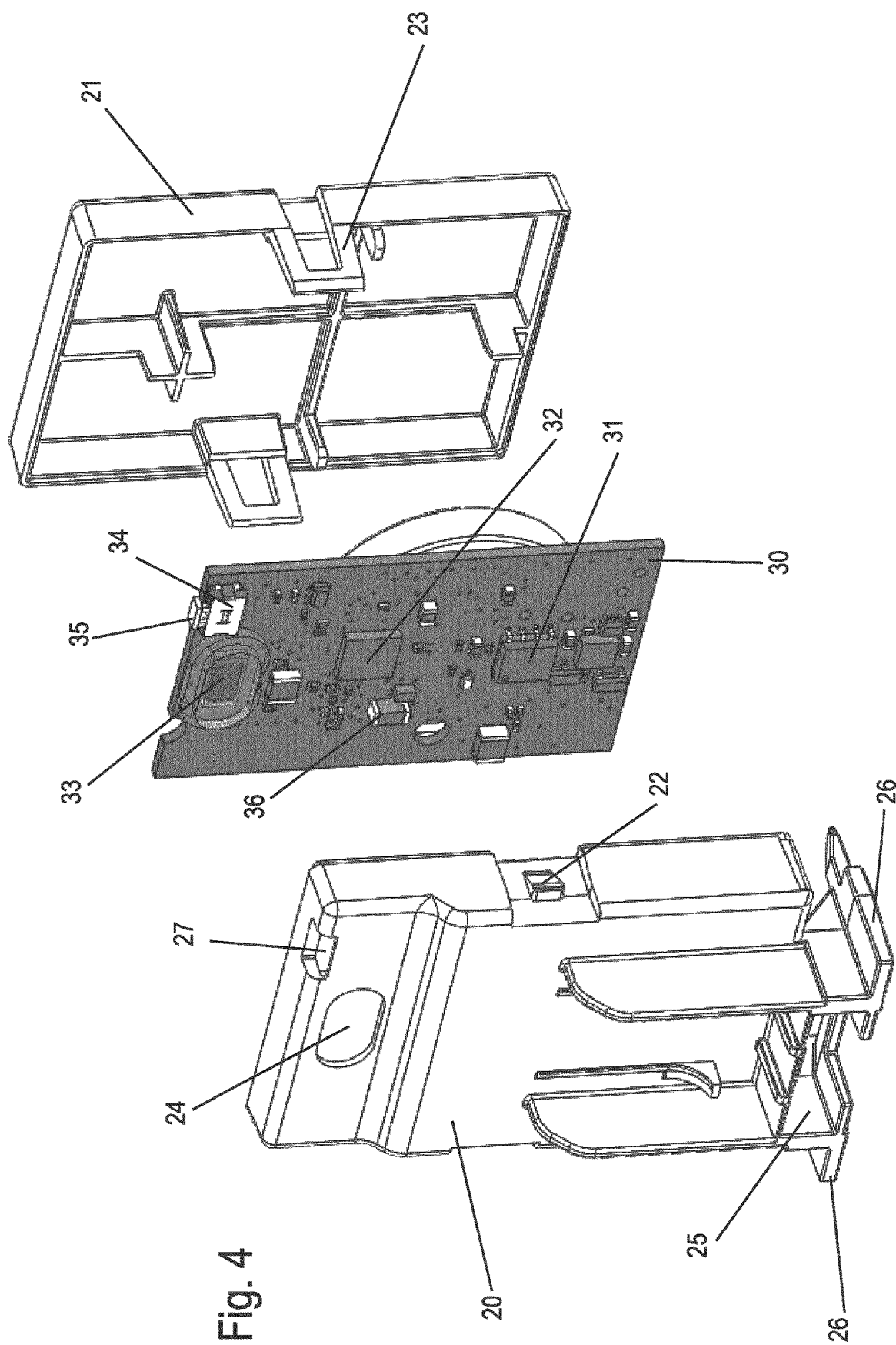

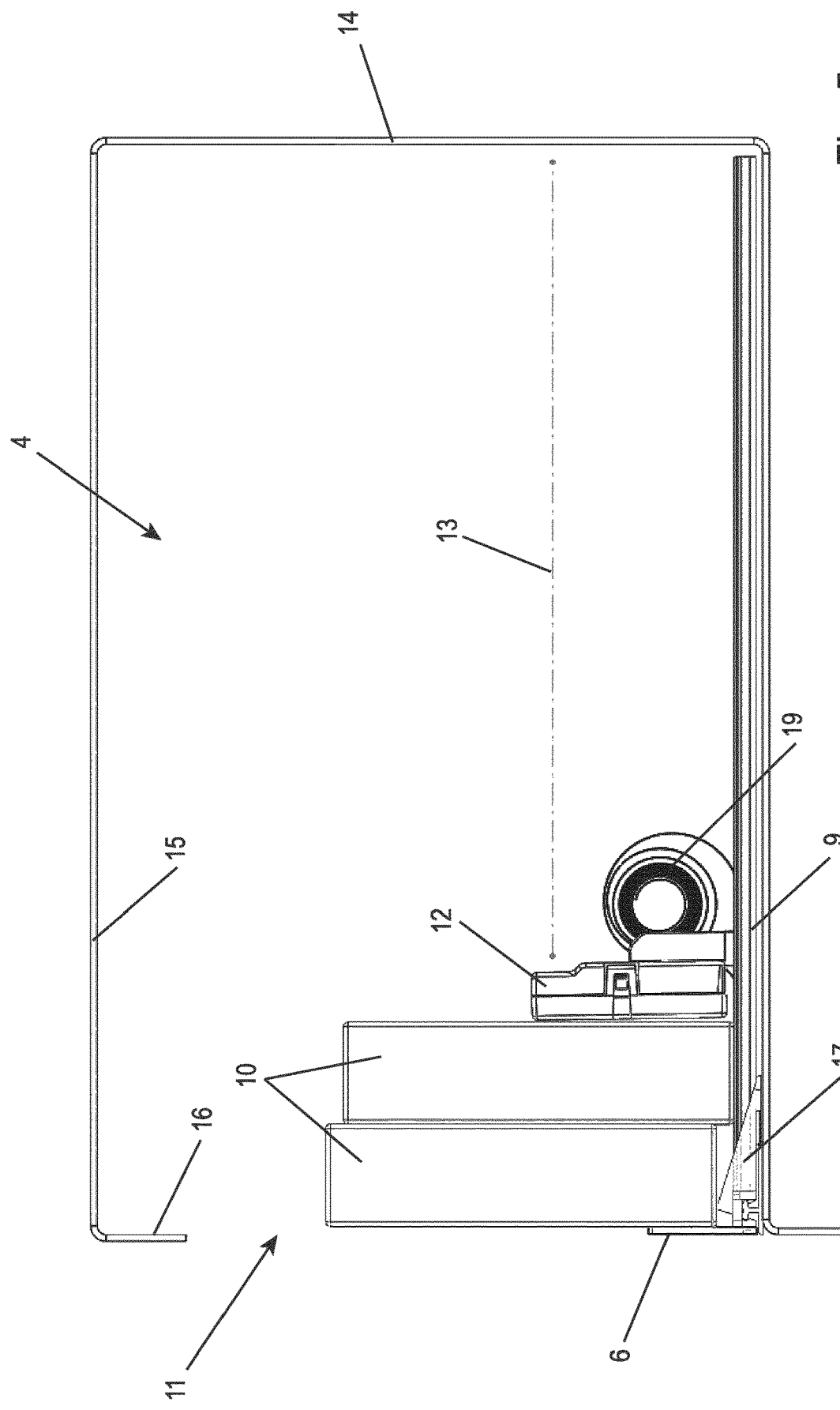

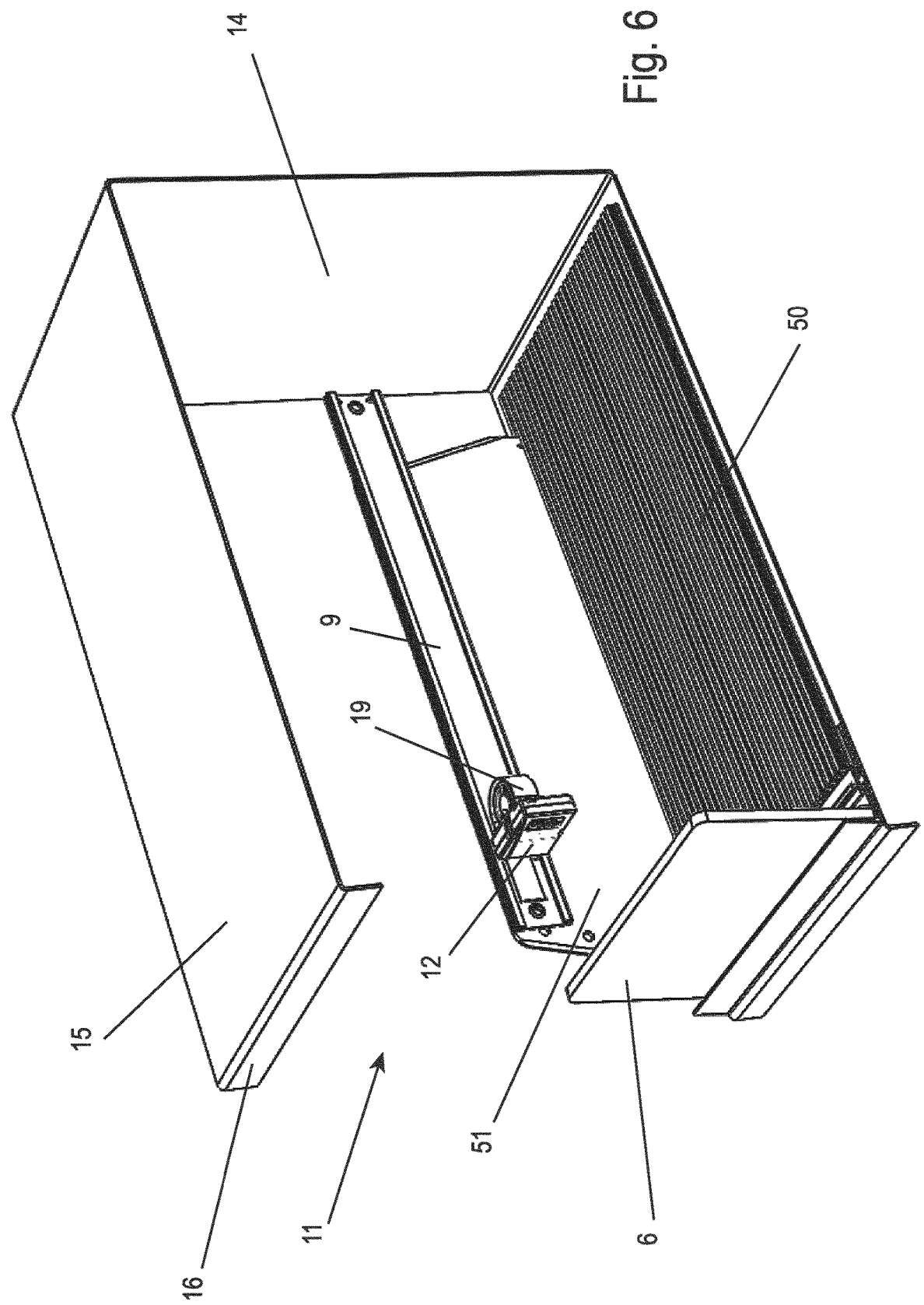

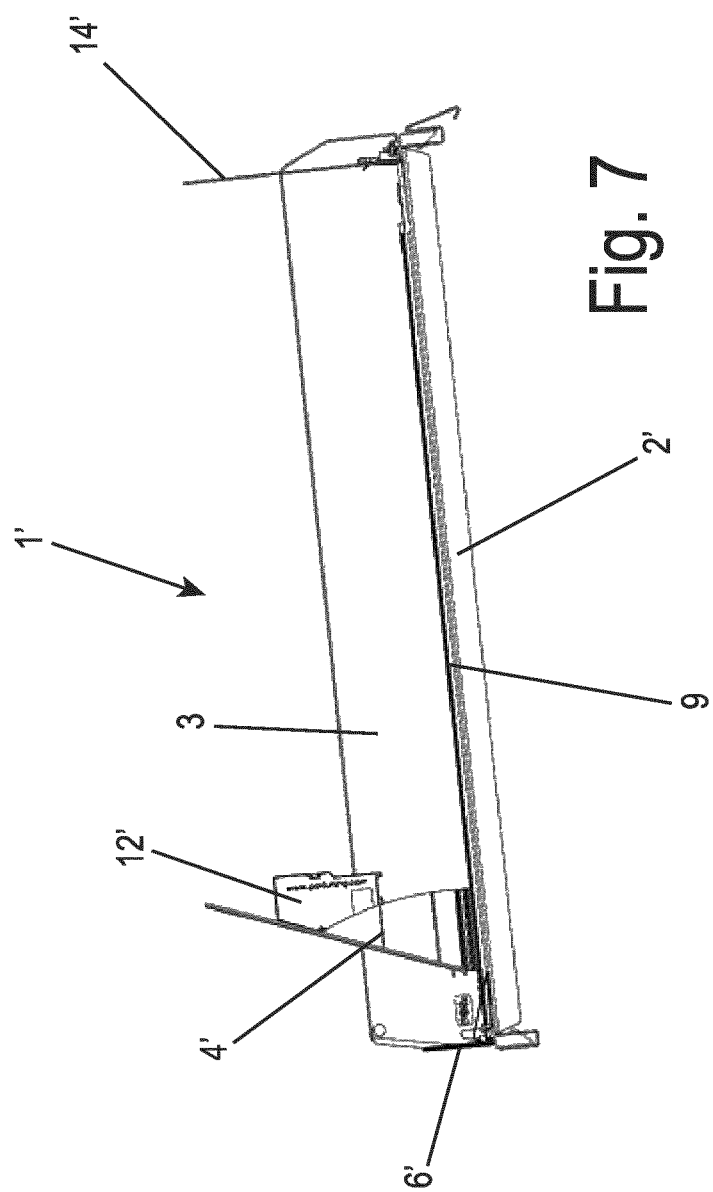

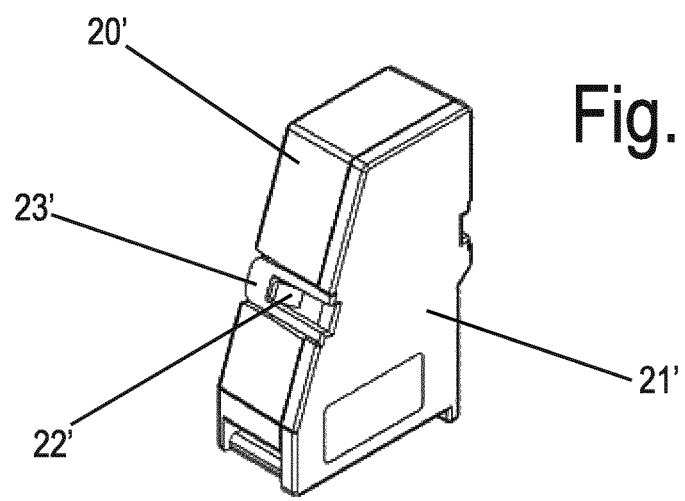
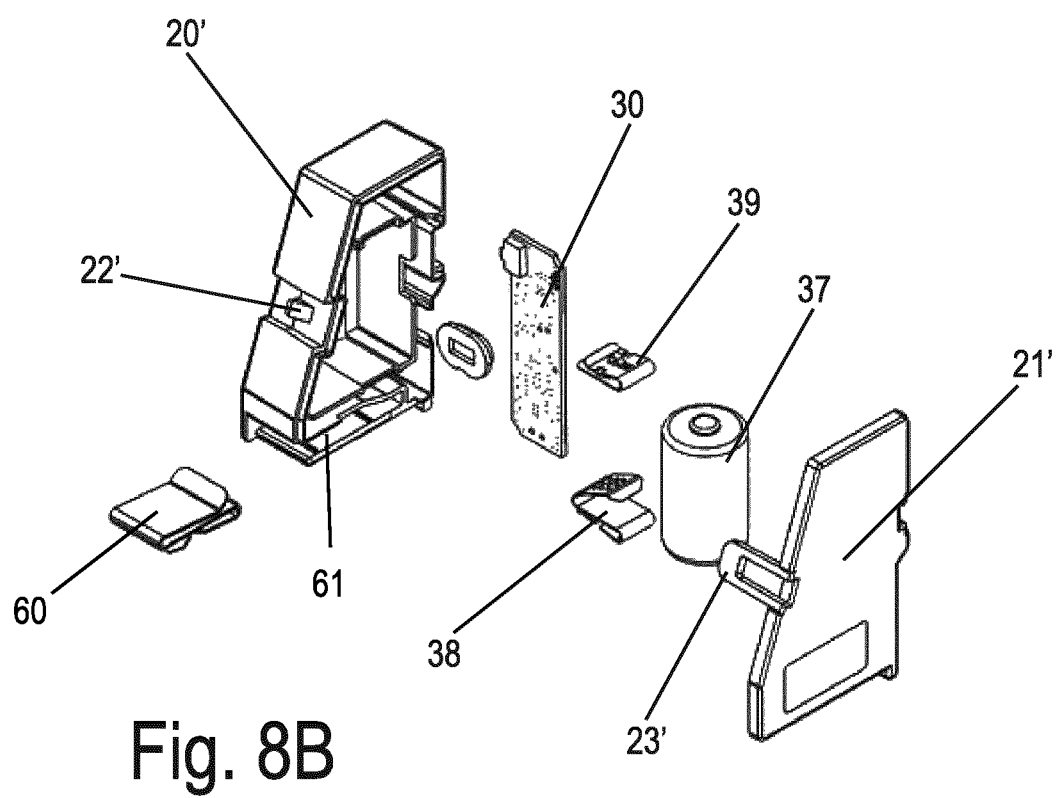

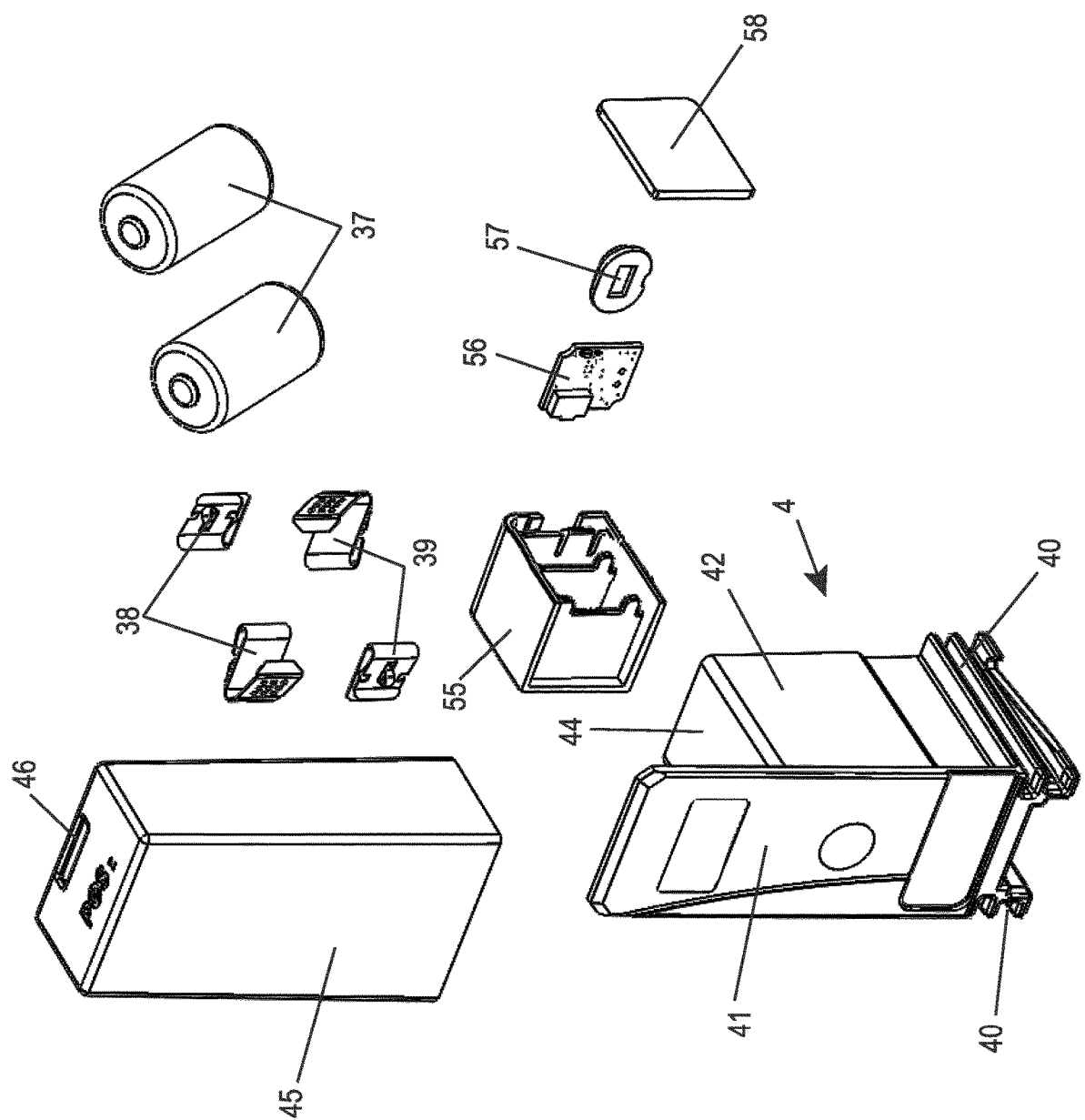

DEVICE FOR FEEDING PRODUCTS AND METHOD FOR RECORDING A STOCK OF PRODUCTS

CROSS REFERENCE TO RELATED APPLICATIONS

This application is the National Stage of PCT/EP2018/054140 filed on Feb. 20, 2018, which claims priority under 35 U.S.C. § 119 of German Application No. 10 2017 104 041.2 filed on Feb. 27, 2017, the disclosures of which are incorporated by reference. The international application under PCT article 21(2) was not published in English.

BACKGROUND OF THE INVENTION

The present invention relates to a device for feeding products, comprising a compartment for storing a plurality of products, on which compartment one or more products can be removed at a removal region, and on the side opposite the removal region a slider pretensioned by a spring rests against one of the products and is moved in the feed direction when a product is removed, wherein a sensor is provided for recording the stock of products, and a method for recording a stock of products on a compartment having a plurality of products.

U.S. Pat. No. 8,260,456 B2 discloses a device for feeding products in which a slider is provided on a product compartment, by means of which the products can be conveyed to a removal region. The slider is guided along a rail, and a sensor is provided at a rear region opposite to the removal region, by means of which the position of the slider can be detected. By recording the position of the slider, continuous inventory monitoring can be carried out. However, it is disadvantageous that the structural expenditure for recording the stock of products is high at the individual compartments and, in addition, due to the ongoing inventory monitoring, there is a high energy requirement, which requires a connection to a power grid.

SUMMARY OF THE INVENTION

It is therefore the object of the present invention to create a device for feeding products as well as a method for detecting a stock of products, which make it possible to detect the stock of products by simple means.

This object is solved with a device with the characteristics of claim 1 and a method with the features of claim 12.

According to the invention, the slider pretensioned by a spring comprises a motion sensor by means of which a movement of the slider can be detected in order to carry out at least one measurement during or after a movement of the slider in order to record the stock of products. This allows the stock of products to be reliably detected or recorded, with a measurement being performed only when the slider is moved or has been moved so that during the remainder of the period a recorded quantity of products is no longer measured by the sensor for recording the stock of products. Energy consumption is thus significantly reduced because measurements to record stock of products are rarely carried out, and the energy required for this can be provided by a power storage device, such as a battery or rechargeable battery, and complex wiring to the power supply is not necessary.

Preferably, the sensor for recording the stock of products is arranged on the slider and can be moved with it. The sensor can be mounted on the slider or retrofitted to a holding part or carrier. In any case, the sensor and slider form a movement unit.

The sensor for recording the stock of products preferably comprises an optical sensor which carries out a distance measurement. By detecting a position of the slider relative to a fixed point, for example a rear wall, the length of the products arranged one behind the other between the removal region and the slider can be easily calculated and, depending on the thickness of the products, the number of products still in the compartment can also be determined. Instead of an optical sensor, other sensors can also be used for length measurement.

In a further embodiment, a circuit board is provided on the slider which comprises the motion sensor and the sensor for recording the stock of products. The circuit board can also be equipped with evaluation electronics to further process the acquired data. In addition, a communication unit may be provided on the circuit board or slider to transfer the measurement data to a control unit located at a distance from the slider, e.g. the control unit may be located in a shopping center or other location to be informed of the removal of a product.

An input unit is preferably provided in order to assign the slider and the sensor for recording the stock of products to a specific compartment, wherein identification of the removed products is possible by means of identification of the slider. For this purpose, a specific identification can be assigned to each circuit board with evaluation electronics, which is assigned to a compartment and/or a product.

In a further embodiment, a temperature sensor is provided which transmits the temperature of the device to the evaluation electronics and/or a control unit. The temperature sensor is used to calibrate the drift phenomena of the sensors and can therefore compensate temperature influences on the measurement, for example when the device is used in a refrigerated area or at a counter with warm food.

The slider in the device according to the invention can optionally serve as a carrier for a motion sensor and a sensor for recording the stock of products, but can also form a feed device for moving the products to a removal region. If a carrier is used for the sensors, the corresponding sensors can be easily retrofitted to existing sliders. The carrier can have different housing forms. For example, in order to increase the measuring accuracy, the sensor for recording the stock of products can be positioned adjacent to a guide device for the slider. For example, an inspection window for the sensor for recording the stock of products may be located less than 6 cm, in particular less than 4 cm, from a guide for the slider. Optionally, a power supply that requires a comparatively large amount of installation space can be positioned at the front of the slider, for example by means of a hood that can be attached to the slider. This allows a gap to be reduced to a stop for products at the front of the slider, which also increases the measuring accuracy. Alternatively, the power supply can also be positioned on the slider at a rear side.

In the method according to the invention, a product is first removed from a removal region in order to move the other products arranged in a compartment. This sliding movement can be detected by means of a spring-loaded slider with a motion sensor, in order to trigger a measurement for the detection of the stock of products by the signal of the motion sensor. The stock of products is then recorded preferably after a movement of the slider and not continuously if the slider is stationary at rest in order to reduce the duration and number of measurements to a minimum.

BRIEF DESCRIPTION OF THE DRAWING FIGURES

FIG. 1 shows a perspective view of a device for feeding products according to the invention;

FIG. 2 shows a side view of the device of FIG. 1 during a measurement;

FIG. 3 shows a detailed perspective view of a slider of the device of FIG. 2;

FIG. 4 shows a perspective exploded view of a housing with a sensor system for the slider of FIG. 3;

FIG. 5 shows a side view of a modified device for feeding products;

FIG. 6 shows another embodiment example of a device for feeding products;

FIG. 7 shows a side view of a modified device for feeding products, and

FIGS. 8A and 8B show two views of the measuring device of FIG. 7.

FIGS. 9A and 9B show two views of another embodiment example of a slider with a measuring device.

DETAILED DESCRIPTION OF THE INVENTION

Figure 9A:
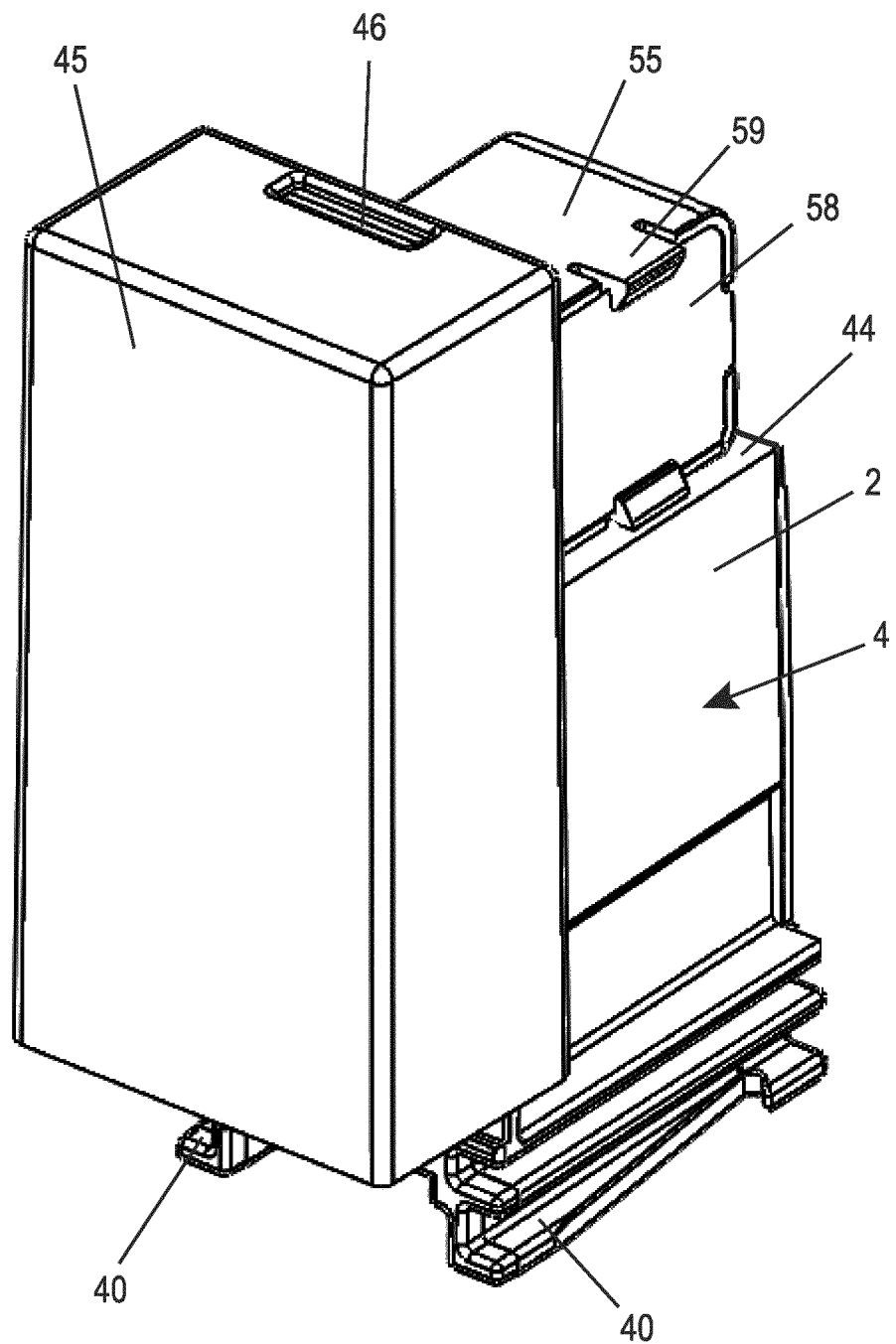

A device 1 for feeding products comprises one or more compartments 2 divided by compartment dividers 3 or other walls. Each compartment 2 is assigned a slider 4 which is pretensioned by a spring 5 to a removal region of compartment 2. For this purpose, the slider 4 is guided along a profile 9 so that it can be moved, wherein the profile 9 can optionally be dispensed with.

An adapter rail 8 is provided at a front removal region, on which a stop 6 and a front panel 7 are provided, forming a stop for the frontmost article at a compartment 2.

In FIG. 2, compartment 2 is shown in a side view in which two products 10 are arranged in a cuboid package provided between the stop 6 and the slider 4. If the frontmost product 10 is removed from a removal region 11, the slider 4 pretensioned by spring 5 moves the remaining product 10 against the stop 6 using an ascending ramp 17 in front of the stop 6. The slider 4 comprises a lower slider part which is guided on the profile 9 and an upper slider 12 which is carried by the lower slider 4 and moved with it. The upper slider 12 can also be retrofitted to existing slider 4. On the upper slider 12 a sensor for recording the stock of products is provided which comprises an optical sensor which emits a wave beam 13 towards the rear which is reflected by a rear wall 14 or another component. By measuring the time until which the reflected beam arrives again at the optical sensor, the position of slider 4 can be measured and thus the number of products 10 in stock in compartment 2 can be determined. Such a sensor is described, for example, in DE 20 2016 105 648, to which reference is made.

Compartment 2 may also have a ceiling wall 15 or the underside of an adjacent shelf, and a web 16 at the front, which limits the removal region 11 upwards. This reduces the access area at the removal region 11, which makes it more difficult to remove a large number of products at the same time.

FIG. 3 shows the slider 4 in detail. The slider 4 has web-shaped guide elements 40 in the lower area, which interact with corresponding guide webs on the profile 9. In addition, the slider 4 comprises a feed plate 41 which rests against the rear of the rearmost product 10. A spring is arranged on a box-shaped housing 42, in particular a coilable band spring which tensions the slider 4 in the feed direction. In addition, rail sections 43 are provided on the housing 42, to which the upper slider 12, which contains the sensors, is fixed.

The upper slider 12 is shown in detail in FIG. 4. A circuit board 30 is arranged in a box-shaped housing with a first housing part 20 and a second housing part 21. The first housing part 20 comprises guide webs 26 in the lower area on foot elements 25, which can be fixed to the rail sections 43. Alternatively, the guide webs 26 can also be guided directly on the profile 9. The housing parts 20 and 21 can be latched together, wherein corresponding latching projections 22 and latching webs 23 are provided for this purpose, which protect the circuit board 30 from environmental influences when the housing parts 20 and 21 are plugged together.

The circuit board 30 comprises evaluation electronics 31, which are connected to a sensor 32 for recording the stock of products. The sensor 32 for recording the stock includes an optical sensor 33 that can emit electromagnetic waves via one optical sensor 33, which can be emitted through a viewing window or recess 24 on the housing part 20. In addition, the optical sensor 33 can detect a reflection to determine the position of the upper slider 12 in compartment 2. A motion sensor 36 is also provided on circuit board 30, which detects a movement of slider 12. The motion sensor 36 can be used to trigger a measurement of sensor 32 to record the stock of products. This ensures that a measurement only takes place after the upper slider 12 has moved, but not continuously if it remains stationary in one position. The circuit board 30 may also contain power supply means, in particular batteries or accumulators, which make wiring to the power supply unnecessary.

Furthermore, an input unit 34 with a button 35 is provided on circuit board 30 in order to assign the upper slider 12 to a specific compartment 2 and thus to certain products 10. An identification can be assigned to the upper slider 12 via the input unit 34, which then enables an assignment to the products 10.

FIG. 5 shows a modified embodiment of a device in which the products, similar to FIG. 2, are conveyed to a removal region 11 in a compartment 2 (FIGS. 1 and 2), wherein only the slider 12 is provided, which is no longer arranged as a carrier for the sensors on top of the slider 4, but the slider 4, which serves as a carrier for the upper slider 12 in FIGS. 3 and 4, has been omitted. Thus, the upper slider 12, which in the previous embodiment example was only a component of the entire slider, can also form the slider itself for conveying the products 10. As in the previous embodiment example, the slider 12 is pretensioned in the feed direction by a spring 19 shown schematically, wherein retaining devices for the spring 19 may also be provided for this purpose.

FIG. 6 shows a further embodiment of a device according to the invention in which products can be conveyed to a removal region 11 arranged above a stop 6. In this embodiment example, however, the products are not conveyed via a slider, but are provided on a support or sliding surface 50, which can optionally be arranged either horizontally or inclined. In an inclined arrangement, the products can be automatically moved by gravity to the stop 6 when the frontmost products are removed. In this embodiment example, a slider 12 is provided which can be moved along a profile 9, wherein profile 9 is provided on a side wall 51. The slider 12 rests against the rear side of the rearmost products and can generate spring forces via the spring 19 for conveying the products in the feed direction or only small forces which ensure that the slider 12 rests against the rearmost products without conveying the products in the feed direction. Optionally, in the embodiment example shown in FIG. 6, a further slider can be provided which conveys the products in the feed direction, so that a first slider 12 is provided for the feed movement and a second slider 12 for recording the stock of products.

In a method for recording the stock of products, the frontmost product 10 is first withdrawn from the removal region 11. Then the remaining products 10 are moved by the slider 4 or gravity or by other means for conveying the products, which is detected by a slider which is pretensioned towards the products 10 by a spring 19 or 5, with the slider having a corresponding motion sensor 36. The motion sensor 36 detects a movement of the slider 12 and can therefore initiate a measuring process to detect the position of the slider 12 so that it can detect how many products have been removed from compartment 2. As soon as the slider 12 is no longer moved and remains stationary, the measuring process is terminated until the slider 12 is moved again. Optionally, a measuring procedure can be carried out only at certain intervals during the movement of the slider 12 in order to reduce the energy consumption for recording the inventory to a minimum.

An optional temperature sensor can be provided on circuit board 30 of slider 12 to reduce temperature influences on the measurement results. Using a communication unit, the collected data can be transmitted wirelessly to a control unit, for example via Bluetooth™ Low Energy.

The motion sensor can, for example, be designed as an acceleration sensor, which triggers a measurement to record the stock of products during acceleration. Then the slider 12 is accelerated at the beginning of a feed movement, which triggers an initial measurement by the acceleration sensor. If the slider 12 is braked again because the frontmost product rests against the stop 6, this is detected again by the acceleration sensor, which triggers a further measurement, so that with only two measurements the stock at the respective compartment 2 can be reliably recorded.

FIG. 7 shows a device 1' for feeding products, in which a slider 4' for feeding products can be moved on a shelf 2' inclined to the horizontal, optionally on a profile arranged on the shelf 2'. The slider 4' pushes the products to a front stop 6' and carries a measuring device 12', which is intended for recording the stock of products. Compartments adjacent to device 1' are separated from each other by compartment dividers 3. The measuring device 12' comprises a motion sensor which detects a movement of the slider 4' and thereby switches on a controller in order to carry out a detection of the stock of products via a further sensor. This additional sensor is preferably an optical sensor for distance measurement which can, for example, interact with a rear wall 14' of a shelf or a product receptacle in order to determine the position for recording the stock of products. The inclination of the shelf 2' can be set between 0° and 45°, preferably between 5° and 30°, depending on the shelf.

In FIGS. 8A and 8B the measuring device 12' is shown in detail. The measuring device 12' comprises a housing which is designed separately from the slider 4A with a first housing part 20' which is pot-shaped and can be closed by a second housing part 21' on the side. The measuring device 12' has a front side which rests against a rear side of a plate of the slider 4', wherein a front side and a rear side of the housing of the measuring device 12' are not oriented parallel but inclined to each other. This allows a plate of the slider 4' to remain essentially vertical, even if the shelf 2' is oriented inclined to the horizontal. As an option, the measuring direction of the optical sensor for recording the stock of goods can also be inclined to the horizontal instead of the horizontal direction.

A clamp 60 is provided on the housing with the housing parts 20' and 21', which serves for the detachable fixing of the measuring device 12' to the slider 4'. For this purpose, clamp 60 can have a first receptacle which is plugged onto a web 61 on the housing part 20' and a second receptacle which is plugged onto a web on the slider 4 so that the measuring device 12' is clamped to the slider 4. This means that the measuring device 12' can be easily retrofitted to the slides 4 or 4' even with existing product feeds. Optionally, the slider 4' can also form a housing to accommodate the measuring device 12', so that no mechanical fastening is necessary.

The housing parts 20' and 21' are subdivided by a vertical parting plane which extends parallel to the feed direction. The second housing part, 21' comprises bracket-shaped locking bars 23' that can be locked to locking projections 22'. A circuit board 30 is provided in the pot-shaped housing part 20', which has sensors for recording the stock of products, as already explained in the previous embodiment examples.

The housing part 20' also contains a power supply in the form of a battery 37, which provides a power supply for the sensors on the circuit board 30 via contacts 38 and 39. The battery 37 can be provided as a button cell, in cylinder form or in other forms.

In FIGS. 9A and 9B the slider 4 described above is equipped with a modified measuring device. A hood 45 is provided on a feed plate 41, which can be fitted from above and fixed to the feed plate 41 using latching means 46. The hood 45 embraces the feed plate 41 and can have guide means for the insertion movement on the inside. In the hood 45 two batteries 37 are provided, which are contacted by contacts 38 and 39 and serve for the power supply of sensors on a circuit board 56. The circuit board 56 is not arranged in the hood 45 but in a holder 55 on a rear side of the feed plate 41 on an upper side 44 of the box-shaped housing 42. For this purpose, the circuit board 56 with the sensors is inserted into the holder 55, which can be closed by a cover 58 which can be fixed by means of latching webs 59 of the holder. The sensors on the circuit board can emit radiation through a window 57 on the holder 55 for distance measurement to a rear wall. Alternatively, it is possible to perform an optical distance measurement to detect the stock of products by a sensor on or in the hood 45 to a fixed point on a front side.

Figure 10:
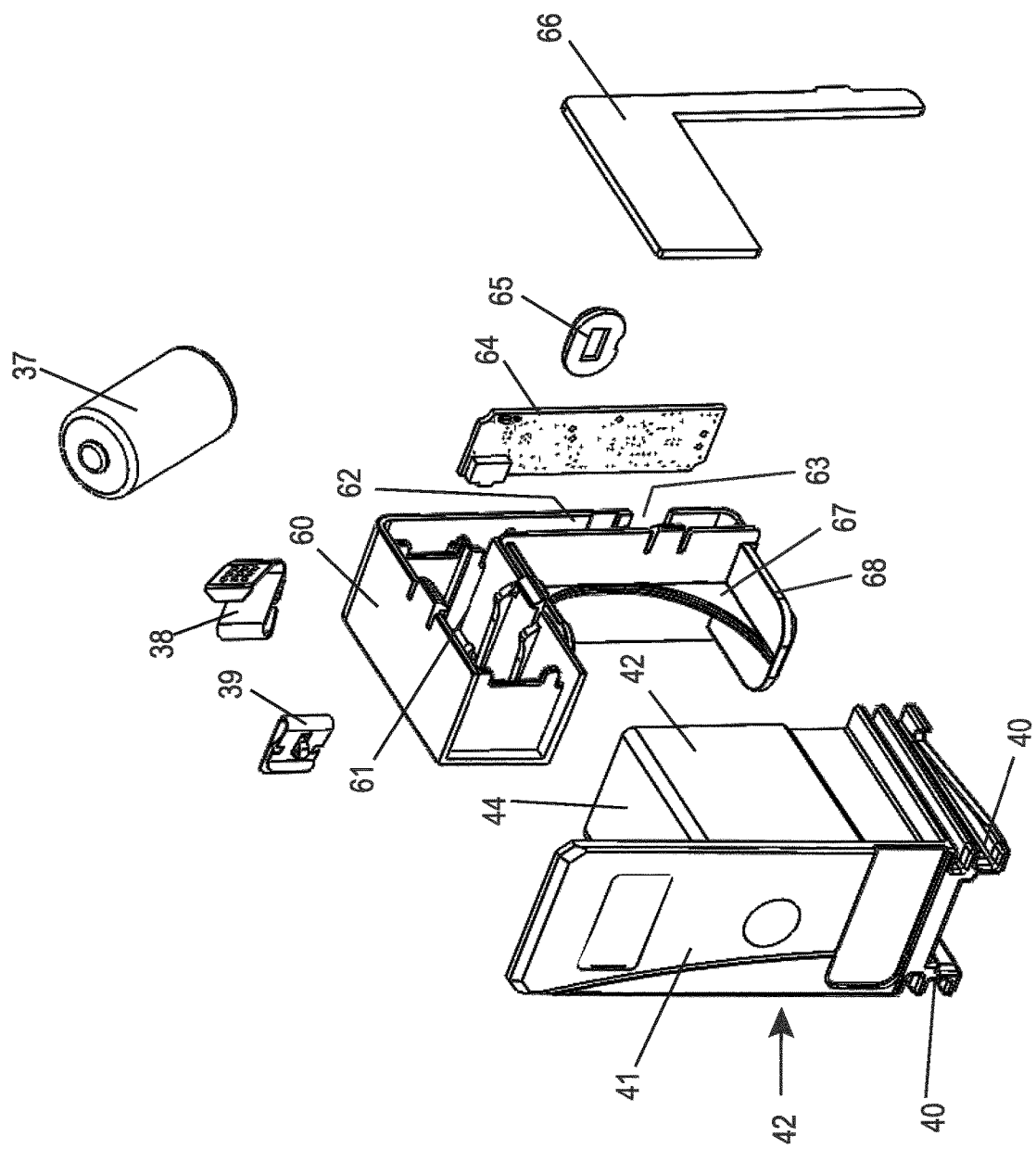
FIG. 10 shows a perspective exploded view of another embodiment example of a slider with a measuring device.

FIG. 10 shows another embodiment example where a modified measuring device is provided on slider 4. The measuring device comprises an angular housing 60 with a receptacle 61 for a battery 37, which is arranged on the upper side 44 of the housing 42 of slider 4. A second receptacle 62 is arranged on a rear side of the housing 42, partly below the upper side 44, and serves to accommodate a circuit board 64, on which sensors are provided for recording the stock of products. A viewing window 65 for the distance sensor is arranged at a rear opening of the receptacle 62, wherein the viewing window is arranged below the upper side 44 of the housing 42. This allows the sensor to be positioned particularly low in order to detect the stock of products, which increases the measuring accuracy. Preferably the viewing window 65 for the sensor is arranged lower than 4 cm above a guide of the profile 9 for the guide elements 40. The receptacles 61 and 62 can be closed with a cover 66. Furthermore, in the lower part of receptacle 62, there is a forward protruding web 68 that can be inserted into a pocket at the back of the housing 42. The web 68 is held by an arcuate reinforcing rib 67, which surrounds a part of a winding of a spring 19 in the housing 42.

In all embodiment examples, an input element or probe can be provided for calibrating the measuring device 12'. The input element can be used to trigger a measuring process without moving the slider 4 or 4', for example to define an end position of the slider 4 or 4' at a front stop 6 or 6' of the product feed.

Furthermore, the embodiment examples can be combined with each other with regard to the housing forms, the power supply and the arrangement of the measuring equipment.

LIST OF REFERENCE NUMERALS 1, 1' Device
2 Compartment
2' Shelf
3 Compartment divider
4, 4' Sliders
5 Spring
6, 6' Stop
7 Front panel
8 Adapter rail
9 Profile
10 Product
11 Removal region
12 Upper slider
12' Measuring equipment
13 Wave beam
14, 14' Rear wall
15 Ceiling wall
16 Web
17 Ramp
19 Spring
20, 20' Housing part
21, 21' Housing part
22, 22' Latching projection
23, 23' Latching web
24 Recess
25 Foot element
26 Guide web
30 Circuit board
31 Evaluation electronics
32 Sensor
33 Sensor
34 Input unit
35 Button
36 Motion sensor
37 Battery
38 Contact
39 Contact
40 Guide element
41 Feed plate
42 Housing
43 Rail section
44 Upper side
45 Hood
46 Latching means
50 Sliding surface
51 Side wall
55 Holder
56 Circuit board
57 Window
58 Cover
59 Latching webs
60 Housing
61 Receptacle
62 Receptacle
63 Opening
64 Circuit board
65 Viewing window
66 Cover
67 Reinforcing rib
68 Web

What is claimed is:

1. A device (1) for feeding products (10), comprising a compartment (2) for storing a plurality of products (10), on which compartment one or more products (10) can be removed from a removal region (11), and on a side opposite the removal region (11) a slider (4, 12) pretensioned by a spring is configured to rest against one of the products (10), and is moved in a feed direction when a product (10) is removed, wherein a sensor for recording the stock of products is arranged on the slider (4, 12) and is movable therewith, and a motion sensor (36) comprising an acceleration sensor is arranged on the slider (4, 12), by means of which a movement of the slider (4, 12) can be detected in order to carry out at least one measurement for recording the stock of products when the slider (4, 12) moves.

2. The device according to claim 1, wherein the sensor for recording the stock of products comprises an optical sensor (33) which carries out a distance measurement.

3. The device according to claim 1, wherein a circuit board (30, 56, 64) is provided on the slider (12, 12'), which circuit board comprises the motion sensor (36) and the sensor for recording the stock of products.

4. The device according to claim 3, wherein evaluation electronics (31) are provided on the circuit board (30, 56, 64).

5. The device according to claim 3, wherein the circuit board (30, 56, 64) is arranged on or in a holder (55) or housing (20, 21; 20', 21', 60) which is detachably fixed to the slider (4).

6. The device according to claim 1, wherein a communication unit is provided on the slider (12, 12'), by means of which the measurement data can be transmitted to a control unit.

7. The device according to claim 1, wherein an input unit (34) is provided in order to assign the slider (12, 12') and the sensor for recording the stock of products to a specific compartment (2), and an identification of the removed products (10) is possible by means of an identification of the slider (12, 12').

8. The device according to claim 4, wherein a temperature sensor is provided which transmits a temperature at the device to the evaluation electronics (31) and/or a control unit.

9. The device according to claim 1, wherein the slider (4, 12, 12') is designed as a feed device for feeding the products (10) to the removal region (11).

10. The device according to claim 1, wherein a power supply (37) is provided at or in the slider (12').

11. A method for recording a stock of products at a compartment (2) having a plurality of products (10), comprising the following steps:
withdrawing products (10) from a removal region (11);
shifting the other products (10) remaining in the compartment (2);
detecting a sliding movement by means of a slider (4, 12, 12') pretensioned by a spring and having a motion sensor (36) comprising an acceleration sensor arranged on the slider (4, 12);

triggering a measurement of a sensor which is arranged on the slider (4, 12) and movable therewith for recording the stock of products by a signal of the motion sensor (36).

12. The method according to claim 11, wherein the measurement for recording the stock of products takes place after a movement of the slider (4, 12, 12') when said slider stands still again.

* * * * *